(12) United States Patent
Song et al.

(10) Patent No.: US 9,601,766 B2
(45) Date of Patent: Mar. 21, 2017

(54) NEGATIVE ACTIVE MATERIAL, LITHIUM BATTERY INCLUDING THE NEGATIVE ACTIVE MATERIAL, AND METHOD OF PREPARING THE NEGATIVE ACTIVE MATERIAL

(71) Applicants: Samsung Electronics Co., Ltd., Suwon-si, Gyeonggi-do (KR); Research & Business Foundation SUNGKYUNKWAN UNIVERSITY, Suwon-si, Gyeonggi-do (KR)

(72) Inventors: Minsang Song, Seongnam-si (KR); Jong Hyeok Park, Suwon-si (KR); Zhang Kan, Suwon-si (KR); Jeongkuk Shon, Hwaseong-si (KR); Geewoo Jang, Suwon-si (KR); Jaeman Choi, Seongnam-si (KR); Junhwan Ku, Seongnam-si (KR); Sangmin Ji, Yongin-si (KR)

(73) Assignees: SAMSUNG ELECTRONICS CO., LTD., Gyeonggi-Do (KR); RESEARCH & BUSINESS FOUNDATION SUNGKYUNKWAN UNIVERSITY, Gyeonggi-Do (KR)

( * ) Notice: Subject to any disclaimer, the term of this patent is extended or adjusted under 35 U.S.C. 154(b) by 0 days.

(21) Appl. No.: 14/809,448

(22) Filed: Jul. 27, 2015

(65) Prior Publication Data
US 2016/0093879 A1     Mar. 31, 2016

(30) Foreign Application Priority Data
Sep. 26, 2014  (KR) .................. 10-2014-0129515

(51) Int. Cl.
*H01M 4/13* (2010.01)
*H01M 4/36* (2006.01)
(Continued)

(52) U.S. Cl.
CPC ............ *H01M 4/366* (2013.01); *H01M 4/04* (2013.01); *H01M 4/0471* (2013.01);
(Continued)

(58) Field of Classification Search
CPC .... H01M 10/052; H01M 4/04; H01M 4/0471; H01M 4/131; H01M 4/134;
(Continued)

(56) References Cited

U.S. PATENT DOCUMENTS

| 2008/0166474 A1* | 7/2008 | Deguchi ............... H01M 4/134 427/122 |
| 2013/0209881 A1* | 8/2013 | Do ........................ H01M 4/134 429/213 |

(Continued)

FOREIGN PATENT DOCUMENTS

| JP | 2011503804 A1 | 1/2011 |
| KR | 100385700 B1 | 5/2003 |

(Continued)

OTHER PUBLICATIONS

Wang et al., "Flexible free-standing graphene-silicon composite film for lithium-ion batteries", Electrochemistry Communications, 12, 2010, pp. 1467-1470.

*Primary Examiner* — Patrick Ryan
*Assistant Examiner* — Ben Lewis
(74) *Attorney, Agent, or Firm* — Cantor Colburn LLP

(57) ABSTRACT

A negative active material including: a composite particle including a non-carbonaceous nanoparticle that allows lithiation and delithiation of lithium ions, and a (meth)acryl polymer disposed on a surface of the non-carbonaceous nanoparticle; and a crystalline carbonaceous nanosheet.

20 Claims, 11 Drawing Sheets

(51) Int. Cl.
*H01M 4/134* (2010.01)
*H01M 4/131* (2010.01)
*H01M 4/485* (2010.01)
*H01M 4/38* (2006.01)
*H01M 4/46* (2006.01)
*H01M 4/62* (2006.01)
*H01M 4/04* (2006.01)
*H01M 4/1391* (2010.01)
*H01M 4/1395* (2010.01)
*H01M 10/052* (2010.01)

(52) U.S. Cl.
CPC ........... *H01M 4/131* (2013.01); *H01M 4/134* (2013.01); *H01M 4/1391* (2013.01); *H01M 4/1395* (2013.01); *H01M 4/38* (2013.01); *H01M 4/386* (2013.01); *H01M 4/387* (2013.01); *H01M 4/463* (2013.01); *H01M 4/466* (2013.01); *H01M 4/485* (2013.01); *H01M 4/62* (2013.01); *H01M 4/622* (2013.01); *H01M 4/625* (2013.01); *H01M 10/052* (2013.01)

(58) Field of Classification Search
CPC .. H01M 4/1391; H01M 4/1395; H01M 4/366; H01M 4/38; H01M 4/386; H01M 4/387; H01M 4/463; H01M 4/466; H01M 4/485; H01M 4/62; H01M 4/622; H01M 4/625
See application file for complete search history.

(56) References Cited

U.S. PATENT DOCUMENTS

| | | |
|---|---|---|
| 2013/0224583 A1 | 8/2013 | Green |
| 2014/0127576 A1* | 5/2014 | Kato .................... H01M 4/131 |
| | | 429/213 |
| 2015/0044559 A1* | 2/2015 | Toyoda .................. H01M 4/13 |
| | | 429/217 |

FOREIGN PATENT DOCUMENTS

| | | |
|---|---|---|
| KR | 101049465 A | 7/2011 |
| KR | 1020130037964 A | 4/2013 |
| KR | 1020130104013 A | 9/2013 |
| KR | 1020130122180 A | 11/2013 |
| WO | 20120124525 A1 | 9/2012 |
| WO | 2013028598 A1 | 2/2013 |

* cited by examiner

NEGATIVE ACTIVE MATERIAL, LITHIUM BATTERY INCLUDING THE NEGATIVE ACTIVE MATERIAL, AND METHOD OF PREPARING THE NEGATIVE ACTIVE MATERIAL

CROSS REFERENCE TO RELATED APPLICATION

This application claims priority to and the benefit of Korean Patent Application No. 10-2014-0129515, filed on Sep. 26, 2014, in the Korean Intellectual Property Office, and all the benefits accruing therefrom under 35 U.S.C. §119, the content of which is incorporated herein in its entirety by reference.

BACKGROUND

1. Field

The present disclosure relates to a negative active material, a lithium battery including the negative active material, and a method of preparing the negative active material.

2. Description of the Related Art

Lithium secondary batteries used in portable electronic devices for information and communication, such as personal data assistants (PDAs), mobile phones, and laptop computers, electric bicycles, electric vehicles, and the like have a discharge voltage of about twice that of aqueous batteries, and thus provide a higher energy density.

Lithium secondary batteries include a positive electrode and a negative electrode, each including an active material that allows intercalation and deintercalation of lithium ions, and an organic electrolyte or a polymer electrolyte between the positive and negative electrodes. Lithium batteries produce electrical energy from redox reactions that take place as lithium ions are intercalated into or deintercalated from the positive and negative electrodes.

As positive active materials of lithium secondary batteries, oxides, e.g., lithium cobalt oxide ($LiCoO_2$), lithium nickel oxide ($LiNiO_2$), or lithium nickel cobalt manganese oxide (e.g., $Li[NiCoMn]O_2$ or $Li[Ni_{1-x-y}Co_xM_y]O_2$), which include lithium and a transition metal formed in a structure capable of intercalation of lithium ions, may be used.

Carbonaceous materials in various forms, such as artificial graphite, natural graphite, or hard carbon, which allow intercalation and deintercalation of lithium ions, and non-carbonaceous materials such as silicon (Si), have been studied for use as negative electrode active materials of lithium secondary batteries.

Such non-carbonaceous materials can provide a very high capacity density, e.g., ten times or greater than that of graphite. However, the volumetric expansion and contraction of non-carbonaceous materials and a continuous reaction between the non-carbonaceous materials and the electrolyte during charge and discharge of the lithium secondary batteries may deteriorate the capacity retention rate, charge/discharge efficiency, and battery life characteristics of a battery. Therefore, there remains a need for an improved negative active material with improved charge/discharge performance.

SUMMARY

Disclosed is a negative active material, which provides improved charge/discharge performance and durability.

Disclosed is a negative electrode including the negative active material.

Aspects are directed toward a lithium battery including the negative electrode.

Aspects are directed toward a method of preparing the negative active material.

Additional aspects will be set forth in part in the description which follows and, in part, will be apparent from the description.

A negative active material includes: a composite particle including a non-carbonaceous nanoparticle that allows lithiation and delithiation of lithium ions, and a (meth)acryl polymer disposed a surface of the non-carbonaceous nanoparticle; and a crystalline carbonaceous nanosheet.

The (meth)acryl polymer may include at least one monomer repeat unit selected from —($C_3H_3N$)—, —($C_3H_5NO$)—, —($C_3H_4O_2$)—, and —($C_3H_3O_2R$)— (wherein R is a $C_1$-$C_{10}$ alkyl group, a $C_6$-$C_{20}$ aryl group, or a $C_3$-$C_{20}$ heteroaryl group), wherein a weight-average molecular weight ($M_w$) of the (meth)acryl polymer is from about 100,000 Daltons (Da) to about 1,000,000 Da.

The (meth)acryl polymer may form a coating layer having a thickness of about 50 nanometers (nm) or less.

According to an embodiment, a lithium battery includes: a negative electrode including the negative active material; a positive electrode disposed facing the negative electrode; and an electrolyte disposed between the negative electrode and the positive electrode.

A method of preparing the negative active material includes: combining a (meth)acryl polymer, a non-carbonaceous nanoparticle that allows lithiation and delithiation of lithium ions, and a solvent to form a mixture; combining the mixture and a surfactant to form an emulsion; heat-treating the emulsion; washing the heat-treated emulsion to form a composite particle including the (meth)acryl polymer on a surface of the non-carbonaceous nanoparticle; and mixing the composite particle with a crystalline carbonaceous nanosheet to form the negative active material.

BRIEF DESCRIPTION OF THE DRAWINGS

These and/or other aspects will become apparent and more readily appreciated from the following description of the exemplary embodiments, taken in conjunction with the accompanying drawings in which:

FIGS. 4A to 4E are each a field emission scanning electron microscopic (FE-SEM) image showing a composite particle of Example 1 before and after the coating, wherein FIG. 4A is an FE-SEM image showing silicon (Si) nanoparticles before the coating, FIG. 4B is an FE-SEM image showing Si nanoparticles coated with a polymer, i.e., PAN, and FIGS. 4C to 4E are each an FE-SEM image showing an enlarged view of a portion of FIG. 4B;

DETAILED DESCRIPTION

Figure 1:
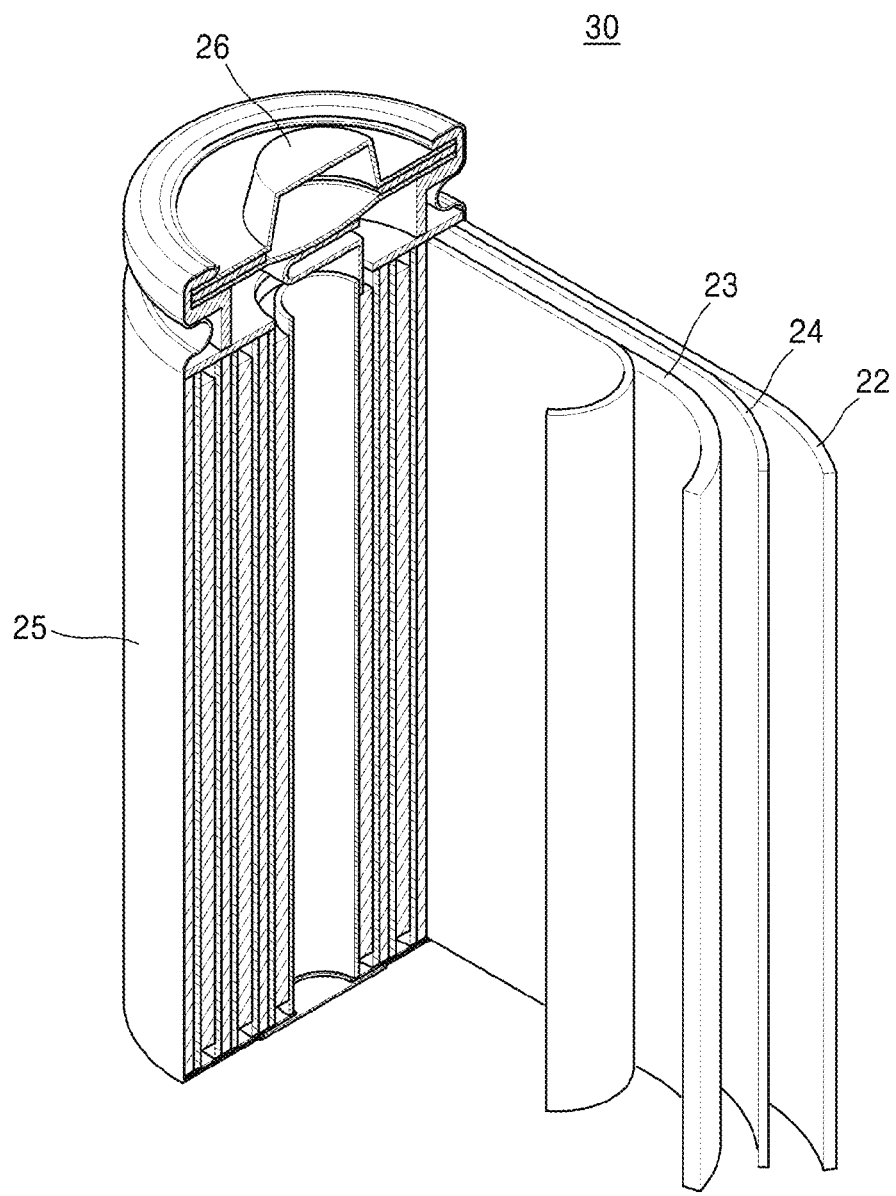
FIG. 1 is a schematic cross-sectional view illustrating an embodiment of a structure of a lithium battery.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Alkylene" means a straight or branched chain, saturated, divalent aliphatic hydrocarbon group, (e.g., methylene ($-CH_2-$) or, propylene ($-(CH_2)_3-$)).

A C rate means a current which will discharge a battery in one hour, e.g., a C rate for a battery having a discharge capacity of 1.6 ampere-hours would be 1.6 amperes.

Hereinafter, a negative active material, a lithium battery including the negative active material, and a method of preparing the negative active material are disclosed in further detail.

According to an embodiment, a negative active material includes a composite particle including a polymer coating on a surface of a secondary particle that comprises non-carbonaceous nanoparticle that allows lithiation and delithiation, i.e., incorporating and deincorporating, e.g., alloying and dealloying, or intercalating and deintercalating, of lithium ions; and a crystalline carbonaceous nanosheet.

The negative active material includes the composite particle including the polymer coating on the surface of a secondary particle that comprises the non-carbonaceous nanoparticle, and in this regard, a volume expansion of the non-carbonaceous nanoparticle during charge and discharge may decrease a continuous reaction between the negative active material and an electrolyte. In addition, the use of the composite particle and the crystalline carbonaceous nanosheet in combination may improve conductivity of lithium ions as well as charge/discharge performance of a lithium battery.

The non-carbonaceous material may include any suitable non-carbonaceous material that provides high capacity as a negative active material in a lithium battery, as long as the non-carbonaceous nanoparticle allows lithiation and delithiation of lithium ions. The term "non-carbonaceous" as used herein refers to inclusion of at least 50 weight percent (weight %) of a negative active material other than a carbonaceous material. For example, the non-carbonaceous nanoparticle may include at least about 60 weight %, about 70 weight %, about 80 weight %, about 90 weight %, or about 60 weight % to about 100 weight %, or about 70 weight % to about 95 wt % of a non-carbonaceous material, or in some exemplary embodiments, about 100 weight % of a non-carbonaceous material.

As a material that is available as the at least one non-carbonaceous nanoparticle and allows lithiation and delithiation of lithium ions, the material may include at least one element selected from silicon (Si), germanium (Ge), tin (Sn), lead (Pb), aluminum (Al), gallium (Ga), indium (In), zinc (Zn), cadmium (Cd), magnesium (Mg), calcium (Ca), thallium (Ti), vanadium (V), and bismuth (Bi). Silicon and tin, specifically silicon is mentioned.

The material that is available as the non-carbonaceous nanoparticle and allows lithiation and delithiation of lithium ions may be, for example, Si, $SiO_x$ (0<x<2), a Si—Z alloy (wherein Z is at least one selected from an alkali metal, an alkaline earth metal, a Group 13 element, a Group 14 element, a Group 15 element, a Group 16 element, a transition metal, and a rare earth element; and is not Si), Sn, $SnO_2$, or a Sn—Z' alloy (wherein Z is at least one selected from an alkali metal, an alkaline earth metal, a Group 13 element, a Group 14 element, a Group 15 element, a Group 16 element, a transition metal, and a rare earth element; and is not Sn), and in some embodiments, at least one of these examples of the material may be used in combination with $SiO_2$. The element Z and Z' may each independently be at least one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, and Po. The non-carbonaceous nanoparticle may be used alone or in a combination thereof.

In an embodiment, the non-carbonaceous nanoparticle may be a silicon-based nanoparticle, such as Si, $SiO_x$ (0<x<2), or a Si—Z alloy (wherein Z is at least one selected from an alkali metal, an alkaline earth metal, a Group 13 element, a Group 14 element, a Group 15 element, a Group 16 element, a transition metal, and a rare earth element; and is not Si). The at least one silicon-based nanoparticle may be an amorphous silicon, a crystalline silicon (either monocrystalline or polycrystalline), or a combination thereof. The silicon-based nanoparticle may be used alone or in a combination of two thereof.

An average particle diameter of the non-carbonaceous nanoparticle is not particularly limited within a range of nanometer size, and for example, may be about 500 nanometers (nm) or less. In detail, the non-carbonaceous nanoparticle may have an average particle diameter of from about 1 nm to about 500 nm, and in some exemplary embodiments, from about 50 nm to about 50 nm, and in some other exemplary embodiments, from about 90 nm to about 110 nm.

The non-carbonaceous nanoparticle may include a primary particle consisting of a single nanoparticle, a secondary particle comprising or consisting of a plurality of nanoparticles that are connected to each other in a linear configuration, or a combination of the primary and secondary particles. In this regard, a surface of the secondary particle may be coated with the polymer.

The entire surface of the secondary particle may be coated with the polymer, and accordingly, a volumetric change of the non-carbonaceous nanoparticle may be suppressed in an efficient manner. In addition, a continuous reaction between the non-carbonaceous nanoparticle and an electrolyte may be reduced or eliminated, thereby improving cycle life characteristics.

The (meth)acryl polymer includes any polymer derived from polymerization of an acryl or a methacryl monomer, e.g., acrylonitrile, methacrylonitrile, acrylamide, methacrylamide, acrylic acid, methacrylic acid, or an ester of acrylic or methacrylic acid. Acryl polymers are preferred. Thus, the (meth)acryl polymer includes at least one monomer repeat unit selected from —$(C_3H_3N)$—, —$(C_3H_5NO)$—, —$(C_3H_4O_2)$—, and —$(C_3H_3O_2R)$—(wherein R is a $C_1$-$C_{10}$ alkyl group, a $C_6$-$C_{20}$ aryl group, or a $C_3$-$C_{20}$ heteroaryl group), wherein a weight-average molecular weight ($M_w$) of the (meth)acryl polymer is from about 100,000 Daltons (Da) to about 1,000,000 Da, or about 200,000 Da to about 800,000 Da. The (meth)acryl polymer including the monomer repeat unit may have a suitable adhesive strength. The (meth)acryl polymer may include the monomer repeat unit within a backbone thereof, and may further include a linker, such as an arylene group, an alkylene group, —$SO_2$—, —S—, or —O—, between the monomer repeat units. In this regard, chemical and mechanical properties of a lithium battery may be improved.

The (meth)acryl polymer may comprise, for example, a (meth)acryl polymer, such as at least one selected from polyacrylonitrile, polyacrylamide, polyacrylic acid, and a poly(meth)acrylate, but the polymer is not limited thereto.

An amount of the (meth)acryl polymer may be from about 1 to about 40 parts by weight, or about 2 to about 30 parts by weight, based on 100 parts by weight of a total weight of the non-carbonaceous nanoparticle and the (meth)acryl polymer.

The (meth)acryl polymer may be disposed on an entire surface of a particle of the non-carbonaceous nanoparticle. Here, a method of coating the surface may be carried out, for example, by the emulsion process disclosed below, but the method is not limited thereto. Any suitable coating method used in the art may be used.

A thickness of a coating layer formed by the (meth)acryl polymer may be uniformly or non-uniformly formed depending on an amount of the polymer, a condition of the uniform mixing, or a drying condition. A thickness of a coating layer comprising the (meth)acryl polymer may be about 50 nm or less, and in some embodiments, from about 0.1 nm to about 50 nm, and in some other exemplary embodiments, from about 0.5 nm to about 50 nm.

The polymer coated as described above may be in the form of a gel, and gelation may be induced by an electrolyte that is injected between a negative electrode and a positive electrode in preparing of a lithium battery. Here, the non-carbonaceous nanoparticle may be embedded in the gel polymer. While not wanting to be bound by theory, it is understood that by embedding the non-carbonaceous nanoparticle in the gel, a transformational change, e.g., a non-topotactic change, of the non-carbonaceous nanoparticle during the volume expansion of the non-carbonaceous nanoparticle during charge and discharge may be minimized or effectively eliminated.

The composite particles in which the polymer coats the surface of each of the particles formed of the non-carbonaceous nanoparticle may agglomerate together or may be combined together to form an agglomerate.

The negative active material may include the crystalline carbonaceous nanosheet in addition to the composite particle. The crystalline carbonaceous nanosheet may be simply mixed with the composite particle, without being embedded in the composite particle, or maybe physically and/or chemically combined.

The crystalline carbonaceous nanosheet may comprise a carbonaceous material having a planar crystalline structure. The planar structure may be planar on an atomic scale, and a larger scale may include various transformational changes by twisting, rolling, or partially disrupting a structure on the basis of a two-dimensional structural form. In addition, the term "carbonaceous" as used herein refers to inclusion of at least about 50 weight % of carbon. For example, the carbonaceous nanosheet may include at least about 60 weight %, about 70 weight %, about 80 weight %, or about 90 weight %, or about 60 weight % to about 100 weight %, or about 70 weight % to about 95 wt % of carbon, or in some exemplary embodiments, about 100 weight % of carbon.

The crystalline carbonaceous nanosheet may include, for example, a polycyclic nanosheet wherein six-membered rings of carbon atoms are connected to each other in a hexagonal shape, wherein the six-membered rings of carbon atoms are aligned on a plane. The polycyclic nanosheet may be, for example, graphene. Here, graphene refers to a single layer of carbon atoms, and graphite refers to multiple layers of carbon atoms. In addition, the crystalline carbonaceous nanosheet may include a laminate of the polycyclic nanosheets, e.g., a structure wherein about 2 to about 100 layers of the polycyclic nanosheets are disposed on one another in a vertical direction, e.g. to form a laminate.

The polycyclic nanosheet or the laminate thereof may be obtained by, for example, exfoliation or separation of a graphite sheet from graphite, such as natural graphite or artificial graphite. Alternatively, the polycyclic nanosheet or the laminate thereof may be obtained by separation of expanded graphite in a form of a nanosheet upon ultrasonic treatment. Here, the expanded graphite refers to graphite formed in such a way that a compound or element is intercalated between layers of graphite, followed by being heated so as to expand layers vertically.

As the crystalline carbonaceous nanosheet, an oxide prepared by oxidizing a part of or an entirety of the polycyclic nanosheet or the laminate thereof may be used. For example, the crystalline carbonaceous nanosheet may include a reduced graphene oxide (RGO). The RGO may be prepared by removing most of or a part of oxygen through a chemical reduction process with respect to a graphene oxide, wherein a ratio of oxygen included in the RGO varies according to an extent of the reduction. The RGO may be produced in mass in a liquefied form, and may also contribute to the improvement of electrical conductivity of the negative active material to provide improved electronic conductivity and formation of a secondary electronic conduction passage.

The crystalline carbonaceous nanosheet may be used alone or in a combination thereof.

In an exemplary embodiment, a thickness of the crystalline carbonaceous nanosheet may be about 50 nm or less. For example, a thickness of the crystalline carbonaceous nanosheet may be from about 0.1 nm to about 50 nm, and in some exemplary embodiments, from about 5 to nm to about 20 nm. In addition, an average area of the crystalline carbonaceous nanosheet may be from about 1 square micrometer ($\mu m^2$) to about 100 $\mu m^2$.

In an embodiment, the crystalline carbonaceous nanosheet may have a thickness of about 50 nm or less, or about 1 nm to about 50 nm, or about 2 nm to about 40 nm, and an aspect ratio of about 300 or more, or about 300 to about 1000, or about 400 to about 800.

The crystalline carbonaceous nanosheet may have a large specific surface area, and may be flexible. In this regard, a number of pores or spaces between the composite particles may be compensated. In addition, the crystalline carbonaceous nanosheet may provide a conductive path between the composite particles so as to improve electrical conductivity of the negative active material. In addition, the crystalline carbonaceous nanosheet may have an effect on suppressing a volumetric change of the at least one non-carbonaceous nanoparticle during charge and discharge.

The composite particle and the crystalline carbonaceous nanosheet may be combined at a weight ratio of from 70:30 to 95:5. For example, the composite particle and the crystalline carbonaceous nanosheet may be combined at a weight ratio of from 70:30 to 90:10, or from 90:10 to 95:5. Here, a relative ratio of the non-carbonaceous nanoparticle showing high capacity within these ranges is sufficiently provided, and accordingly, the crystalline carbonaceous nanosheet may be included in the negative active material within a range suitable for the improvement of electrical conductivity of the negative active material.

Hereinafter, a method of preparing the negative active material will be further disclosed.

According to an embodiment, a method of preparing the negative active material includes: preparing a mixture in which a polymer and a non-carbonaceous nanoparticle that allows lithiation and delithiation of lithium ions are dispersed; obtaining an emulsion in which the mixture is combined with a solution in which a surfactant is dispersed; obtaining a composite particle by heat-treating and washing the emulsion, wherein the composite particle includes an elastic polymer that coats a surface of the non-carbonaceous nanoparticle; and mixing the composite particle with a crystalline carbonaceous nanosheet to prepare the negative active material.

In an embodiment, a method of preparing a negative active material comprises: combining an (meth)acryl polymer, a non-carbonaceous nanoparticle that allows lithiation and delithiation of lithium ions, and a solvent to form a mixture; combining the mixture and a surfactant to form an emulsion; heat-treating the emulsion; washing the heat-treated emulsion to form a composite particle comprising the (meth)acryl polymer on a surface of the non-carbonaceous nanoparticle; and mixing the composite particle with a crystalline carbonaceous nanosheet to form the negative active material.

The mixture in which the non-carbonaceous nanoparticle and the polymer are dispersed may be prepared by, for example, mixing and stirring a first solution in which the non-carbonaceous nanoparticle is dispersed and a second solution in which the polymer is dispersed.

As a solvent used in the first and second solutions, any organic solvent suitable for dispersing a medium in each of the first and second solutions may be used. For example, an organic solvent, such as toluene, hexane, or ether, may be used to disperse the non-carbonaceous nanoparticle. For example, an organic solvent, such as dimethylformamide, N-methylpyrrolidone, acetonitrile, tetrahydrofuran, or dimethyl sulfoxide, may be used to disperse the polymer.

The first and second solutions maybe mixed together, and then stirred so as to uniformly disperse the non-carbonaceous nanoparticle and the polymer.

The mixture is then combined with a solution in which a surfactant is dispersed, so as to obtain an emulsion.

The surfactant may be a non-ionizing surfactant, and an example thereof is a non-ionizing polyether surfactant. The non-ionizing polyether surfactant may include at least one polymeric component including an oxyalkylene repeat unit (e.g., a unit of the formula —O—R— wherein R is a $C_2$-$C_6$ alkylene group. The non-ionizing polyether surfactant may include a block polymer having two or more different oxyalkylene repeat units. The block polymer may be a polyoxyethylene-polyoxypropylene block copolymer or a derivative thereof, and in some embodiments, may be an ethylene diamine additive of the polyoxyethylene-polyoxypropylene block copolymer, but the block polymer is not limited thereto.

An example of the polyoxyethylene-polyoxypropylene block copolymer is a poloxamer which available under the trade name Pluronic™ from BASF. An example of the ethylene diamine additive of the polyoxyethylene-polyoxypropylene block copolymer is poloxamine available under the trade name Tetronic™ from BASF. Examples of the non-ionizing polyether surfactant are the BASF products Pluronic F38, Pluronic F68, Pluronic 68LF, Pluronic F77, Pluronic F87, Pluronic F88, Pluronic F98, Pluronic F108, Pluronic F127, Pluronic L35, Tetronic 707, Tetronic 908, Tetronic 909, Tetronic 1107, Tetronic 1307, and Tetronic 1508, but the ethylene diamine additive is not limited thereto.

As a solvent used to disperse the surfactant, a polar organic solvent may be used, and examples thereof are formamide, N-methylpyrrolidone, acetonitrile, tetrahydrofuran, and dimethyl sulfoxide.

When the mixture in which the non-carbonaceous nanoparticle and the polymer are dispersed is combined with the solution in which the surfactant is dispersed, due to the properties of the surfactant, an emulsion-type mixed solution is obtained.

Figure 2:
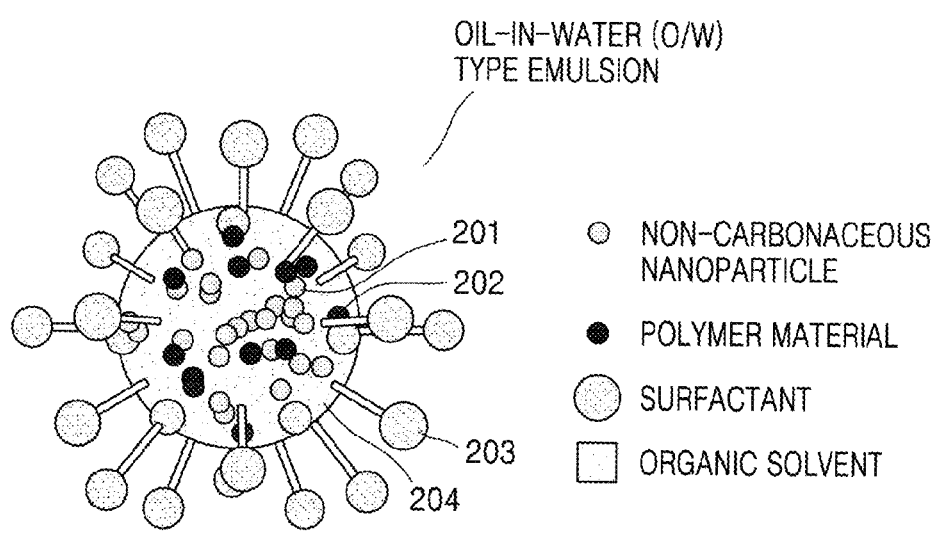
FIG. 2 is a schematic view illustrating an embodiment of an emulsion formulation as a part of a method of preparing a negative active material.

Here, the non-carbonaceous nanoparticle and the polymer may be contained in the organic solvent, and accordingly, a dispersed emulsion is formed by the surfactant. FIG. 2 is a schematic view illustrating an emulsion obtained according to an embodiment. Here, the emulsion is formed as an oil-in-water (O/W) emulsion. The emulsion may comprise the non-carbonaceous particle 201, a polymer 202, e.g., a (meth)acryl polymer, a surfactant 203, and an organic solvent 204.

Figure 3:
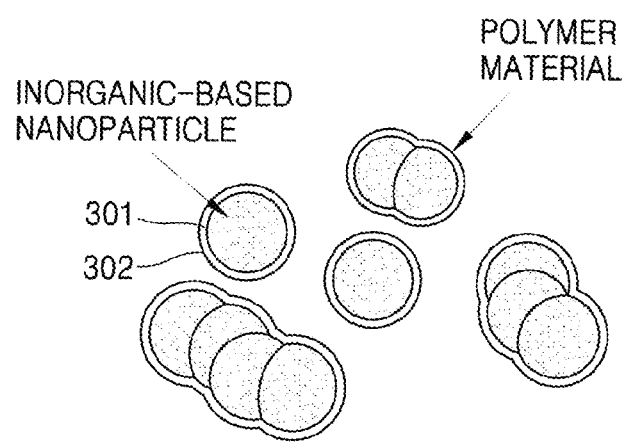
FIG. 3 is a schematic view illustrating an embodiment of composite particles of a negative active material, wherein the composite particles each include a negative active material comprising a polymer coating on a non-carbonaceous nanoparticle 301.

The emulsion may be subjected to a heat treatment including a heating process and a drying process to remove the organic solvent used herein. Through a cleaning or washing process, the surfactant and other foreign materials may be removed from the product of the heat treatment, and then, a composite particle including an elastic polymer that coats a surface of the secondary particle formed of the non-carbonaceous nanoparticle is obtained. FIG. 3 is a schematic view illustrating the composite particle comprising a non-carbonaceous particle 301 having a polymer coating 302 thereon obtained according to an embodiment.

A temperature to which the heat treatment is performed is not particularly limited as long as the organic solvent used is evaporated.

The composite particle and the crystalline carbonaceous nanosheet are combined in a desired ratio so as to obtain the negative active material.

According to an embodiment, a lithium battery includes the negative active material in a negative electrode.

In an embodiment, the lithium battery includes a negative electrode including the negative active material; a positive electrode disposed facing the negative electrode; and an electrolyte disposed between the negative electrode and the positive electrode.

The negative electrode may include the negative active material. For example, the negative active material, a binder, and optionally, a conductive agent are combined in a solvent to prepare a negative active material composition, and then, the negative active material composition may be molded in a predetermined shape, or coated on a current collector, such as a copper foil.

The negative electrode may further include, in addition to the negative active material, an additional negative active material that is used in the art as a negative active material in a lithium battery. The additional negative active material may include at least one selected from a lithium metal, a metal alloyable with lithium, a transition metal oxide, a non-transition metal oxide, and a carbonaceous material.

For example, the metal alloyable with lithium may include silicon (Si), tin (Sn), aluminum (Al), germanium (Ge), lead (Pb), bismuth (Bi), antimony (Sb), an Si—Y alloy (wherein Y is an alkali metal, an alkaline earth metal, a Group 13 element, a Group 14 element, a Group 15 element, a Group 16 element, a transition metal, a rare earth element, or a combination thereof; and is not Si), or an Sn—Y' alloy (wherein Y is an alkali metal, an alkaline earth metal, a Group 13 element, a Group 14 element, a Group 15 element, a Group 16 element, a transition metal, a rare earth element, or a combination thereof; and is not Sn). The Y and Y' may each independently be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, and Po.

For example, the transition metal oxide may include a lithium titanium oxide, a vanadium oxide, or a lithium vanadium oxide.

For example, the non-transition metal oxide may be $SnO_2$ or $SiO_x$ ($0<x<2$).

The carbonaceous material may include crystalline carbon, amorphous carbon, or a combination thereof. The crystalline carbon may include graphite, such as natural graphite or artificial graphite, that is amorphous or has a planar, flake, spherical, or fibrous form. The amorphous carbon may include soft carbon (low-temperature calcined carbon) or hard carbon, mesophase pitch carbide, calcined cork, or the like.

In an embodiment, when the negative active material and the carbonaceous material are used together, an oxidation reaction of the silicon-based alloy may be suppressed, and accordingly, a solid electrolyte interphase (SEI) layer may be formed in an efficient manner. In this regard, a stable coating layer may be formed and the electrical conductivity of the lithium battery may be improved, thereby further enhancing charging and discharging characteristics of lithium.

The material for forming the negative active material generally available in the art may be mixed or blended with the negative active material, coated over a surface of the negative active material, or formed in any other suitable combination.

The binder included in the negative active material composition is a component assisting in binding the negative active material and the conductive agent, wherein an amount of the binder may be in a range from about 1 to about 50 parts by weight, based on 100 parts by weight of the negative active material. For example, an amount of the binder may be in a range from about 1 to about 30 parts by weight, from about 1 to about 20 parts by weight, or from about 1 to about 15 parts by weight, based on 100 parts by weight of the negative active material. Examples of the binder are polyvinylidenefluoride, polyvinylidenechloride, polybenzimidazole, polyimide, polyvinylacetate, polyacrylonitrile, polyvinylalcohol, carboxymethylcellulose (CMC), starch, hydroxypropylcellulose, regenerated cellulose, polyvinylpyrrolidone, tetrafluoroethylene, polyethylene, polypropylene, polystyrene, polymethylmethacrylate, polyaniline, acrylonitrilebutadienestyrene, phenol resin, epoxy resin, polyethylenetelethphalate, polytetrafluoroethylene, polyphenylsulfide, polyamideimide, polyetherimide, polyethylenesulfone, polyamide, polyacetal, polyphenyleneoxide, polybutylenetelephthalate, ethylene-propylene-diene terpolymer (EPDM), sulfonated EPDM, styrene butadiene rubber, fluoride rubber, and copolymers thereof.

The negative electrode may further optionally include a conductive agent to provide a conductive passage to the negative active material to further improve electrical conductivity. As the conductive agent, any suitable material used in a lithium battery may be used herein. Examples of the conductive agent are a carbonaceous material such as carbon black, acetylene black, ketjen black, carbon fiber (e.g., a vapor phase growth carbon fiber); a metal-based material such as copper, nickel, aluminum silver, or the like, each of which may be used in powder or fiber form; a conductive polymer such as polyphenylene derivative; and a mixture thereof. An amount of the conductive agent may be appropriately controlled. For example, the conductive agent may be added in such an amount that a weight ratio of the negative active material to the conductive agent is in a range of 99:1 to 90:10.

The solvent may be N-methylpyrrolidone (NMP), acetone, water, or the like. An amount of the solvent may be in a range of about 1 to about 60 parts by weight, based on 100 parts by weight of the negative active material. When the amount of the solvent is within this range, an active material layer may be easily formed.

Also, the current collector may have a thickness of from about 3 µm to about 500 µm. The current collector is not particularly limited as long as the current collector does not cause an undesirable chemical change in a battery and has sufficient conductivity. Examples of a material for forming the current collector are copper, stainless steel, aluminum, nickel, titanium, calcined carbon, copper and stainless steel that are surface-treated with carbon, nickel, titanium, silver, or the like, an alloy of aluminum and cadmium, or the like. Also, an uneven micro-structure may be formed on the surface of the current collector to enhance a binding force with the negative active material. Also, the current collector may be used in various forms including a film, a sheet, a foil, a net, a porous structure, a foaming structure, a non-woven structure, or the like.

The prepared negative active material composition may be directly coated on a current collector to form a negative electrode plate, or may be cast onto a separate support and a negative active material film exfoliated from the support laminated on a current collector, such as a copper foil, to obtain a negative electrode plate. The negative electrode is not particularly limited to the formation described above, and may be in the form other than the formation described above.

The negative active material composition may be printed on a flexible electrode substrate to manufacture a printable battery, in addition to the use in manufacturing a lithium battery.

Separately, for the manufacture of a positive electrode, a positive active material composition prepared by mixing a positive active material, a conductive agent, a binder, and a solvent is prepared.

As the positive active material, any suitable lithium-containing metal oxide that is used in the related art may be used herein.

For example, the positive active material may be a compound represented by one of the following formulas: $Li_aA_{1-b}B'_bD'_2$ (where $0.90 \leq a \leq 1.8$, and $0 \leq b \leq 0.5$); $Li_aE_{1-b}B'_bO_{2-c}D_c$ (where $0.90 \leq a \leq 1.8$, $0 \leq b \leq 0.5$, and $0 \leq c \leq 0.05$); $LiE_{2-b}B'_bO_{4-c}D'_c$ (where $0 \leq b \leq 0.5$ and $0 \leq c \leq 0.05$); $Li_aNi_{1-b-c}Co_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1.8$, $0 \leq b \leq 0.5$, $0c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3 (0 \leq f \leq 2)$; $Li_{(3-f)}Fe_2(PO_4)_3 (0 \leq f \leq 2)$; and $LiFePO_4$.

In the formulas above, A denotes nickel (Ni), cobalt (Co), manganese (Mn), and combinations thereof; B' denotes aluminum (Al), nickel (Ni), cobalt (Co), manganese (Mn), chromium (Cr), iron (Fe), magnesium (Mg), strontium (Sr), vanadium (V), a rare earth element, and combinations thereof; D' denotes oxygen (O), fluorine (F), sulfur (S), phosphorus (P), and combinations thereof; cobalt (Co), manganese (Mn), and combinations thereof; F' denotes fluorine (F), sulfur (S), phosphorus (P), and combinations thereof; G denotes aluminum (Al), chromium (Cr), manganese (Mn), iron (Fe), magnesium (Mg), lanthanum (La), cerium (Ce), strontium (Sr), vanadium (V), and combinations thereof; Q denotes titanium (Ti), molybdenum (Mo), manganese (Mn), and combinations thereof; I' denotes chromium (Cr), vanadium (V), iron (Fe), scandium (Sc), yttrium (Y), and combinations thereof; and J denotes vanadium (V), chromium (Cr), manganese (Mn), cobalt (Co), nickel (Ni), copper (Cu), and combinations thereof.

The compounds listed above as positive active materials may have a surface coating layer (i.e., a coating layer). Alternatively, a mixture of a compound not having a coating layer and a compound having a coating layer, the compounds being selected from the compounds listed above, may be used. The coating layer may include an oxide, hydroxide, oxyhydroxide, oxycarbonate, or hydroxycarbonate of the coating element. The compound forming the coating layer may be amorphous or crystalline. The compounds for the coating layer may be amorphous or crystalline. The coating element for the coating layer may be at least one selected from magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), and zirconium (Zr). The coating layer may be formed using any suitable method (e.g., a spray coating method, a dipping method, or the like) that does not adversely affect the physical properties of the positive active material when a compound of the coating element is used. Details of a method of preparing the coating layer can be determined by one of skill in the art without undue experimentation and thus will not be further described in detail herein.

For example, $LiNiO_2$, $LiCoO_2$, $LiMn_xO_{2x}$(x=1, 2), $LiNi_{1-x}Mn_xO_2$(0<x<1), $LiNi_{1-x-y}Co_xMn_yO_2$(0≤x≤0.5, 0≤y≤5), $LiFeO_2$, $V_2O_5$, TiS, MoS, or the like may be used.

The conductive agent, the binder, and the solvent included in preparing the positive active material composition may be identical to those included in the negative active material composition. In some cases, a plasticizer may be further added to the positive active material composition and the negative active material composition to form pores in a corresponding electrode plate. Amounts of the positive active material, the conductive agent, the binder, and the solvent may be at the same levels used in a lithium battery of the related art.

A positive electrode current collector may have a thickness in a range of about 3 µm to about 500 µm, may be any suitable current collectors that does not cause an adverse chemical change in a battery and has high conductivity. Examples of the positive electrode current collector are stainless steel, aluminum, nickel, titanium, calcined carbon, and aluminum and stainless steel that are optionally surface-treated with carbon, nickel, titanium, silver, or the like. The positive electrode current collector may have an uneven micro structure at its surface to enhance a binding force with the positive active material. Also, the current collector may be used in various forms including a film, a sheet, a foil, a net, a porous structure, a foaming structure, a non-woven structure, or the like.

The prepared positive active material composition may be directly coated on the positive electrode current collector to form a positive electrode plate, or may be cast onto a separate support and a positive active material film exfoliated from the support is laminated on the positive electrode current collector, such as a copper foil, to obtain a positive electrode plate.

The positive electrode may be separated from the negative electrode by a separator, and the separator may be any suitable separator that is used in a lithium battery. For example, the separator may include a material that has a low resistance to migration of ions of an electrolyte and an excellent electrolytic solution-retaining capability. For example, the separator may include at least one material selected from glass fiber, polyester, Teflon, polyethylene, polypropylene, and polytetrafluoroethylene (PTFE), each of which may be nonwoven or woven. The separator may have a pore size in a range of about 0.01 to about 10 µm and a thickness in a range of about 5 to about 300 µm.

A lithium salt-containing non-aqueous based electrolyte includes a non-aqueous electrolytic solution and lithium. Examples of the non-aqueous electrolyte are a non-aqueous electrolytic solution, an organic solid electrolyte, an inorganic solid electrolyte, or the like.

As the non-aqueous electrolytic solution, a non-protonic organic solvent may be used, and examples of the non-protonic organic solvent are N-methyl-2-pyrrolidinone, propylene carbonate, ethylene carbonate, butylene carbonate, dimethyl carbonate, diethyl carbonate, fluorinated ethylenecarbonate, ethylenemethylenecarbonate, methylpropylcarbonate, ethylpropanoate, methylacetate, ethylacetate, propylacetate, dimethylester gamma-butyloractone, 1,2-dimethoxy ethane, tetrahydrofuran, 2-methyl tetrahydrofuran, dimethylsulfoxide, 1,3-dioxorane, formamide, dimethylformamide, dioxolane, acetonitrile, nitromethane, methyl formic acid, trimester phosphoric acid, trimethoxy methane, a dioxolane derivative, sulfolane, methyl sulfolane, 1,3-dimethyl-2-imidazolidinone, a propylene carbonate derivative, a tetrahydrofuran derivative, ether, methyl pyrropionic acid, and ethyl pyrropionic acid.

Examples of the organic solid electrolyte are a polyethylene derivative, a polyethylene oxide derivative, a polypropylene oxide derivative, a phosphate ester polymer, polylysine, polyester sulfide, polyvinyl alcohol, poly fluorinated vinylidene, and a polymer having an ionic dissociable group.

Examples of the inorganic solid electrolyte are nitrides, halides, and sulfides of Li, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may be any suitable lithium salt that is used in a lithium battery of the related art. As a material that is dissolved in the non-aqueous electrolyte, for example, one or more of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $CF_3SO_2\,_2NLi$, lithium chloroborate, a lithium lower aliphatic carbonic acid, a lithium 4-phenyl boric acid, or an imide may be used.

Lithium batteries may be categorized as a lithium ion battery, a lithium ion polymer battery, or a lithium polymer battery, according to a separator used and an electrolyte used. Lithium batteries may also be categorized as a cylindrical lithium battery, a square-shaped lithium battery, a coin-shaped lithium battery, or a pouch-shaped lithium battery, according to the shape thereof. Lithium batteries may also be categorized as a bulk-type lithium battery or a thin layer-type lithium battery, according to the size thereof. The lithium batteries listed above may be primary batteries or secondary batteries.

Further details of method of manufacturing the lithium batteries can be determined by one of ordinary skill in the art without undue experimentation and thus will not be described in further detail herein.

FIG. 1 is a schematic view of a lithium battery 30 according to an exemplary embodiment.

Referring to FIG. 1, the lithium battery 30 includes a positive electrode 23, a negative electrode 22, and a separator 24 disposed between the positive electrode 23 and the negative electrode 22. The positive electrode 23, the negative electrode 22, and the separator 24 are wound or folded to be housed in a battery case 25. Then, an electrolyte is injected into the battery case 25, followed by sealing with an encapsulation member 26, thereby completing the manufacture of the lithium battery 30. The battery case 25 may be a cylindrical, rectangular, or a thin film type case. The lithium battery 30 may be a lithium ion battery.

The lithium battery 30 according to an embodiment may be suitable for use as power sources for small devices, such as a mobile phone or a portable computer, and may be applied in a unit cell of a battery module of medium and large devices, such as an electric vehicle, that require a plurality of batteries. The lithium battery may be flexible.

The medium and large devices may be, for example, a power tool; an xEV including an electric vehicle (EV), a hybrid electric vehicle (HEV), and a plug-in hybrid electric vehicle (PHEV); an electric motorcycle including an E-bike and an E-scooter; an electric golf cart; an electric truck; an electric commercial vehicle; or an electric power storage system, but the medium and large devices are not limited thereto. Furthermore, the lithium battery may be used any other application that uses high power output, high voltage, and high-temperature driving.

Hereinafter, the present concept will be described in further detail with reference to the following examples. These examples are for illustrative purposes only and are not intended to limit the scope of the present invention.

EXAMPLE 1

0.2 grams (g) of silicon nanoparticles having an average diameter of about 100 nm or less and 0.02 g of reduced graphene oxide (RGO) were dispersed in 10 g of toluene, and 0.1 g of polyacrylonitrile (PAN) was dispersed in 10 g of dimethylformamide (DMF). These two solutions were mixed together, and then, stirred for 1 hour. 200 milliliters (mL) of the mixed solutions was added to 200 mL of formamide in which 5 wt % of surfactant F108 (BASF) was dispersed, thereby forming an emulsion-type mixed solution by using a homogenizer at a speed of 12,000 rpm. The emulsion-type mixed solution was slowly stirred at a temperature of 80° C. at a speed of 150 revolutions per minute (rpm) so as to evaporate toluene therefrom. Accordingly, a composite particle including a PAN coating on the silicon nanoparticles was prepared. The composite particle was washed with ethanol by repeating centrifugation 3 times, and then, was dried overnight at a temperature of 80° C.

The prepared negative active material, a mixture of polyacrylic acid (PAA) and carboxylmethyl cellulose (CMC) mixed at a ratio of 1:1 as a binder, and carbon black as a conductive material, were mixed at a weight ratio of 6:2:2, and then, the mixture of the negative active material, the binder, and the conductive material was mixed with deionized (DI) water as a solvent, thereby manufacturing a negative active material slurry. The negative active material slurry was coated on a negative electrode current collector, i.e., a copper thin film, to a thickness of about 20 μm to about 40 μm, and then, dried at a temperature of 70° C. Afterwards, the negative electrode current collector was dried twice in a vacuum atmosphere, each time being dried for 2 hours at a temperature of 150° C. and for 12 hours at a temperature of 120° C., thereby manufacturing a negative electrode.

Lithium metal was used as a counter electrode, and a mixed solvent of ethylene carbonate (EC), ethylmethyl carbonate (EMC), and fluoroethyl carbonate (FEC) (EC:EMC 3:7 v/v enriched with FEC 10%) to which $LiPF_6$ is dissolved to reach a concentration of 1 molar (M) is used as the electrolyte. In addition, a microporous polyethylene (E16MMS, available from Tonen under the brand name SETELA) was used as a separation layer, thereby manufacturing a lithium battery in a form of a CR2032-type coin cell.

EXAMPLE 2

A lithium battery was manufactured in the same manner as in Example 1, except that 0.2 g of the Si-nanoparticles and 0.06 g of the RGO were used.

COMPARATIVE EXAMPLE 1

A lithium battery was manufactured in the same manner as in Example 1, except that only Si-nanoparticles were used as the negative active material.

COMPARATIVE EXAMPLE 2

A lithium battery was manufactured in the same manner as in Example 1, except that only the composite particle in which the silicon nanoparticles were coated with PAN was used as the negative active material.

EVALUATION EXAMPLE 1

Confirmation of Coating Condition

In order to confirm the coating condition of the composite particle prepared according to Example 1, field emission scanning electron microscopic (FE-SEM) images of the silicon nanoparticles taken before and after the coating were obtained and are provided in FIGS. 4A to 4E.

Figure 4A:
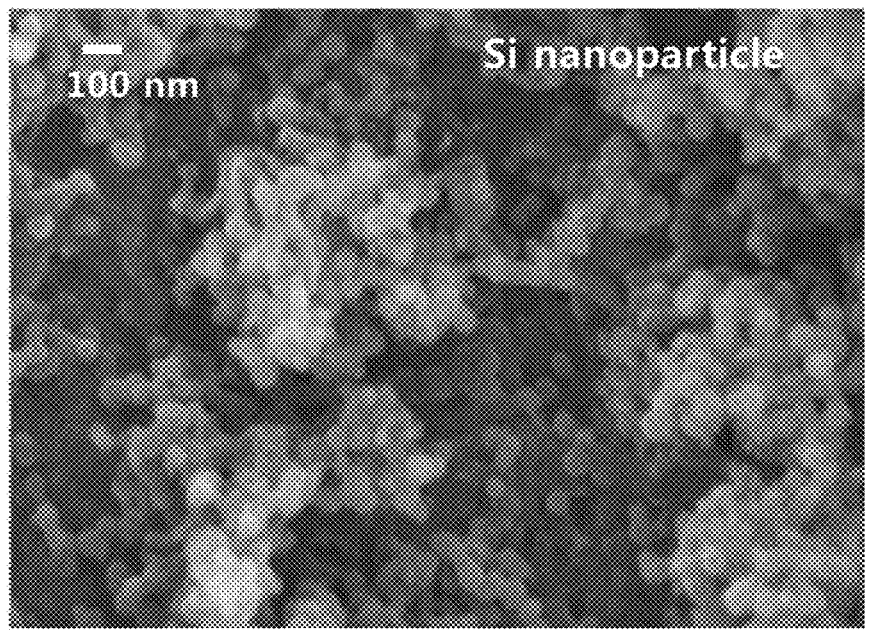
Figure 4B:
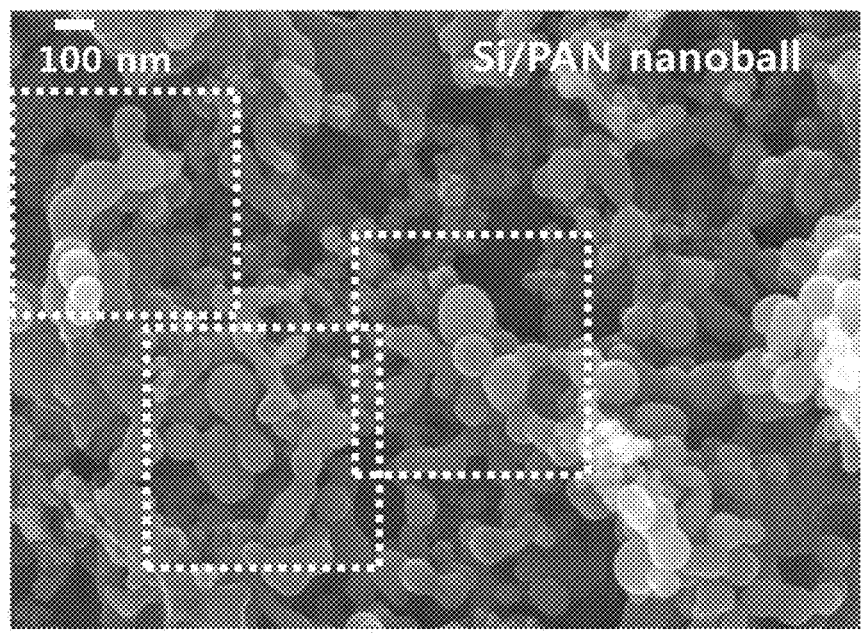
Figure 4C:
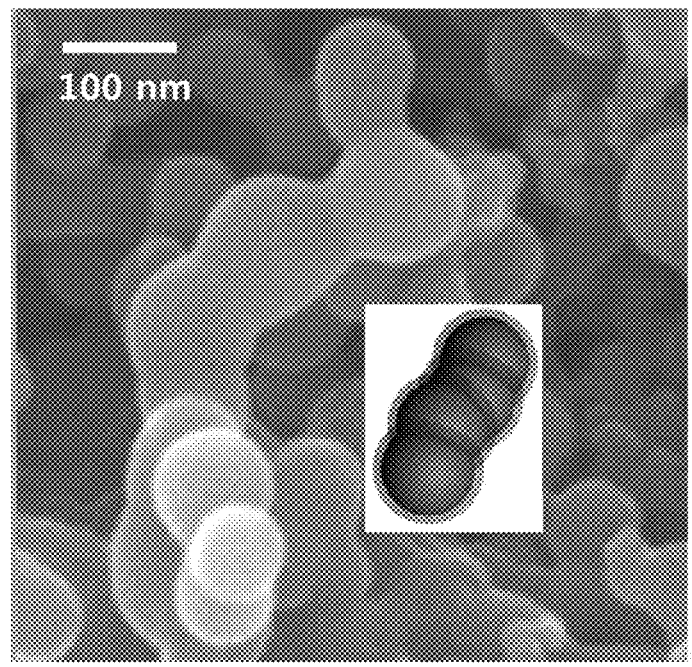
Figure 4D:
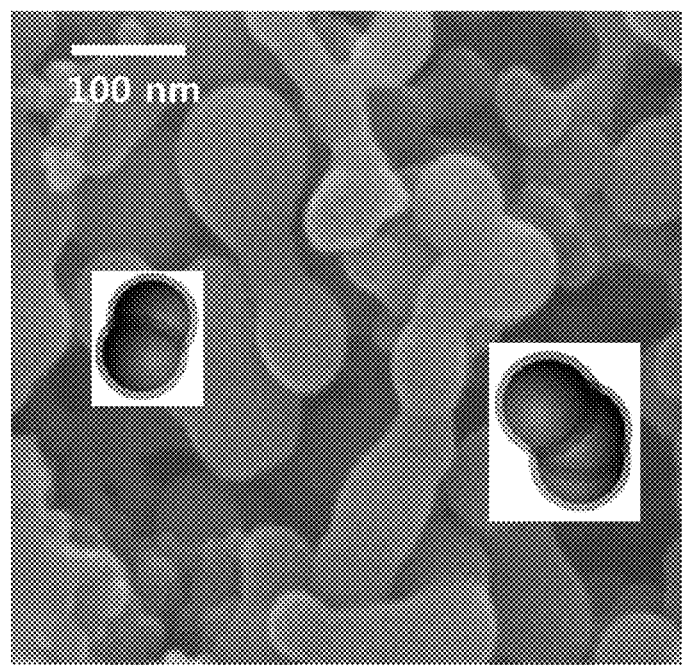
Figure 4E:
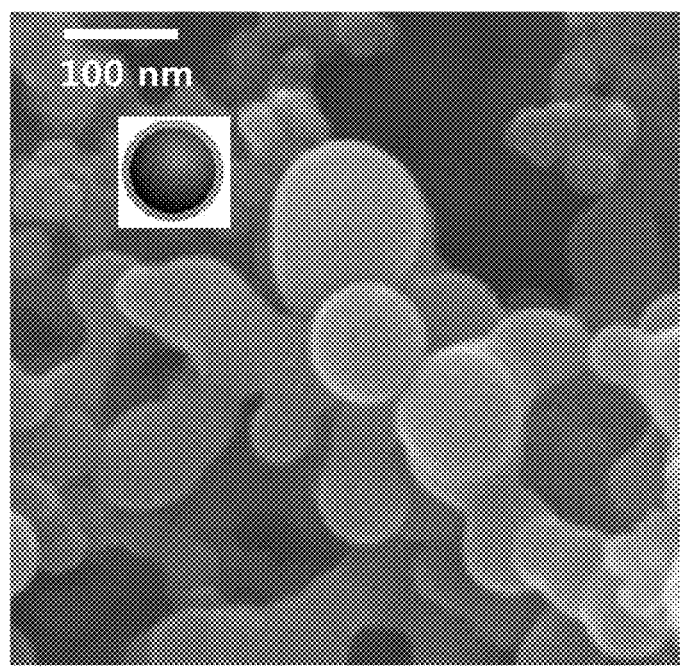

FIG. 4A is an FE-SEM image of the silicon nanoparticles before the coating, FIG. 4b is an FE-SEM image of the silicon nanoparticles after being coated with PAN, and FIGS. 4C to 4E are FE-SEM images showing a magnified part of FIG. 4B.

As shown in FIGS. 4A to 4E, a single particle of the silicon nanoparticles is coated with PAN, or the silicon nanoparticles are linearly connected to each other to form secondary particles, and then, the secondary particles are coated with PAN. It was confirmed that these coated particles agglomerate together and form a composite particle including pores that are formed within the agglomerate.

EVALUATION EXAMPLE 2

Transmission Electron Microscopy (TEM) Analysis

Figure 5A:
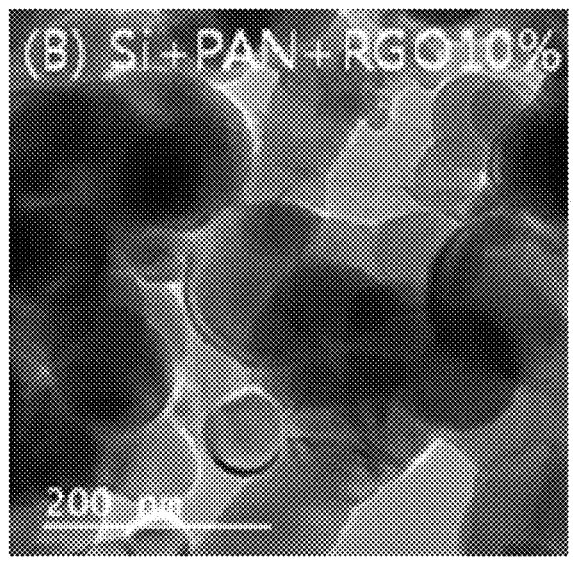
FIGS. 5A and 5B are each a transmission electron microscopic (TEM) image of a negative active material of Examples 1 and 2.
Figure 5B:
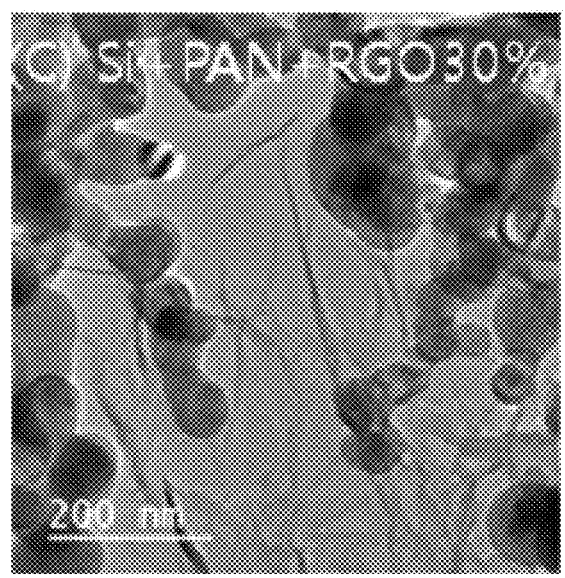

The negative active materials of Examples 1 and 2 were subjected to transmission electron microscopy (TEM) analysis, and the results are shown in FIGS. 5A and 5B, respectively.

As shown in FIGS. 5A and 5B, it was confirmed that the silicon particles coated with PAN are simply mixed with RGO.

EVALUATION EXAMPLE 3

Charging and Discharging Test

The lithium batteries of Examples 1 and 2 and Comparative Examples 1 and 2 were each charged at a constant current at room temperature to a voltage of about 0.01 volts (V) to about 2 V with respect to Li metal in order to measure a discharge capacity and capacity retention thereof.

The lithium batteries were charged and discharged by repeating the charge and discharge cycle 100 times, and a capacity retention ratio (CRR) of the lithium battery at room temperature is defined as Equation 1 below.

$$\text{Capacity retention ratio [\%]} = [\text{Discharge capacity at } 100^{th} \text{ cycle}/\text{Discharge capacity at } 1^{st} \text{ cycle}] \times 100 \quad \text{Equation 1}$$

Figure 6:
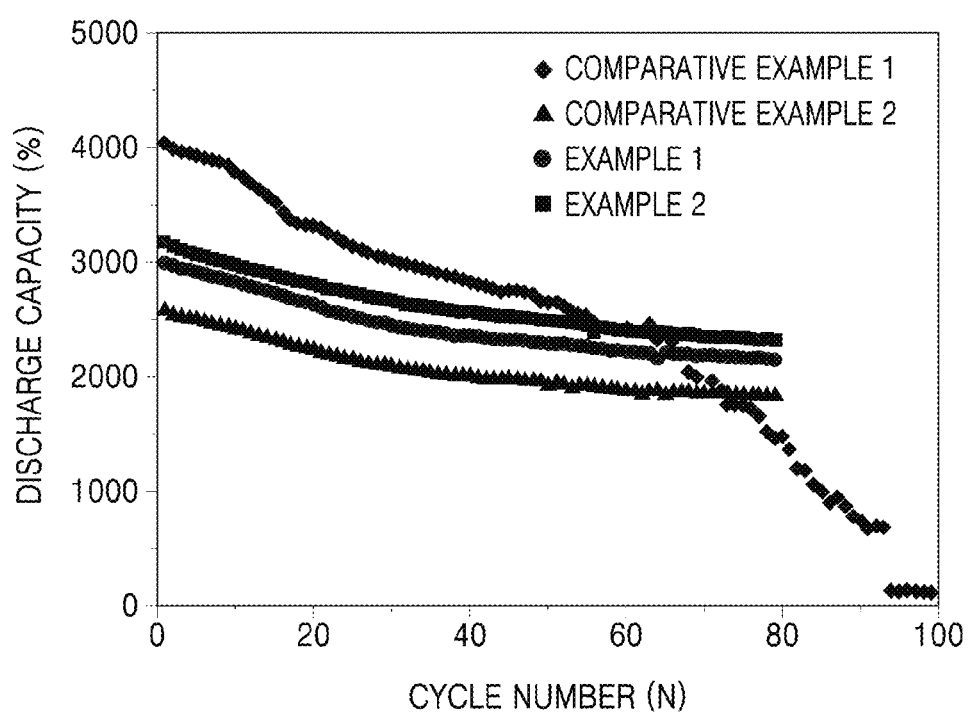
FIG. 6 is a discharge capacity (percent, %) versus cycle number (number, N) showing the discharge capacity of lithium batteries of Examples 1 and 2 and Comparative Examples 1 and 2.
Figure 7:
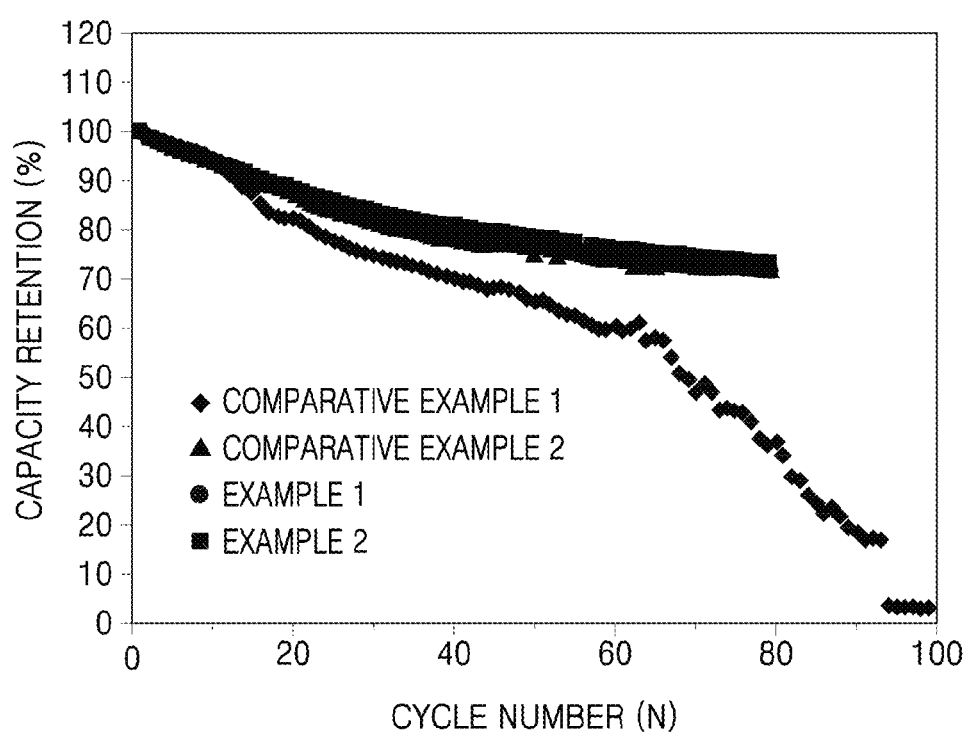
FIG. 7 is a graph of capacity retention (percent, %) versus cycle number (N) showing the charge retention of lithium batteries of Examples 1 and 2 and Comparative Examples 1 and 2.

The discharge capacity per charge and discharge cycle of the lithium batteries of Examples 1 and 2 and Comparative Examples 1 and 2 is shown in FIG. 6 while the capacity retention of the same batteries is shown in FIG. 7.

As shown in FIGS. 6 and 7, a case where the negative active materials of Examples 1 and 2 are used results in similar lifespan characteristics to a case where RGO is not used in the negative active material (Comparative Example 2). However, a case where the negative active materials of Examples 1 and 2 are used results in significantly improved discharge capacity as compared with a case where only the silicon nanoparticles are used (Comparative Example 1) and a case where RGO is not used (Comparative Example 2).

Figure 8:
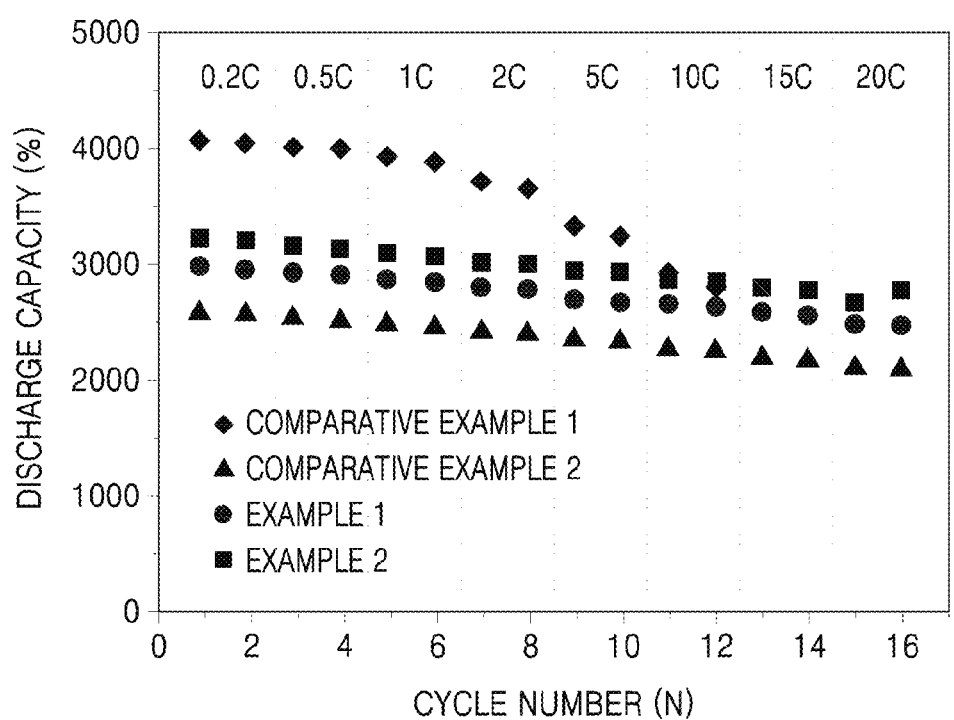
FIG. 8 is a graph of discharge capacity (percent, %) versus cycle number (N) showing the discharge capacity of lithium batteries of Examples 1 and 2 and Comparative Examples 1 and 2 when discharged at various constant current rates.
Figure 9:
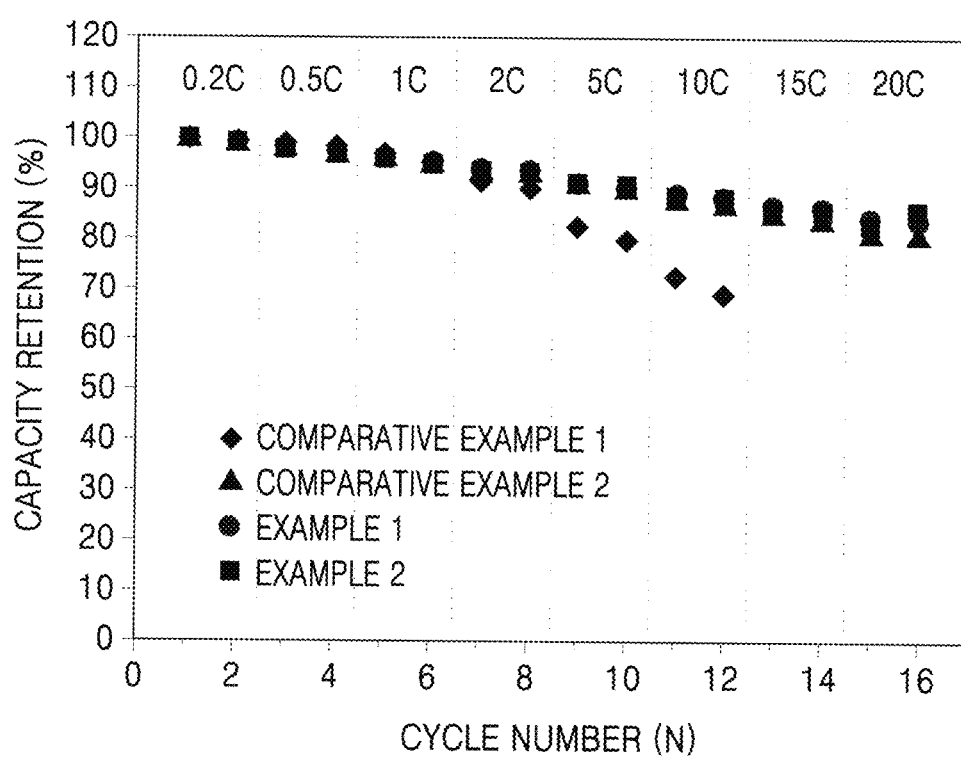
FIG. 9 is a graph of capacity retention (percent, %) versus cycle number (N) showing the capacity retention of lithium batteries of Examples 1 and 2 and Comparative Examples 1 and 2 when discharged at various constant current rates.

In addition, the lithium batteries were charged and discharged in various conditions per charge and discharge cycle. Accordingly, the discharge capacity and the capacity retention per charge and discharge cycle were measured, and the results are shown in FIGS. 8 and 9, respectively. The constant current conditions per charge and discharge cycle include a continuous performance of charging and discharging twice at a constant current of 0.2 C rate twice, at a constant current of 0.5 C rate twice, at constant current of 1 C rate twice, at a constant current of 2 C rate twice, at a constant current of 5 C rate twice, at a constant current of 10 C rate twice, at a constant current of 15 C rate twice, and at a constant current of 20 C rate twice.

As shown in FIGS. 8 and 9, a case where the negative active materials of Examples 1 and 2 are used results in similar lifespan characteristics to a case where RGO is not used in the negative active material (Comparative Example 2). However, a case where the negative active materials of Examples 1 and 2 are used results in a significantly improved discharge capacity as compared with a case where only the silicon nanoparticles are used (Comparative Example 1) and a case where RGO is not used (Comparative Example 2).

EVALUATION EXAMPLE 4

Evaluation of Electrode Durability

The negative active materials of Example 2 and Comparative Example 1 were impregnated in the electrolyte, and then, were artificially and repeatedly bent 30,000 times, making a radius of curvature 25R, i.e., a radius of 25 mm. Afterwards, the deintercalation results of the negative active materials are each compared in FIGS. 10 and 11.

In addition, after being bent 30,000 times, deintercalation phenomena of the negative electrode assembly of Example 2 and Comparative Example 1 were checked and the results are shown in Table 1 below.

TABLE 1

|  | Example 2 | Comparative Example 1 |
| --- | --- | --- |
| Deintercalation of assembly after being bent about 30,000 times | Not observed | 3.6% |

Figure 10:
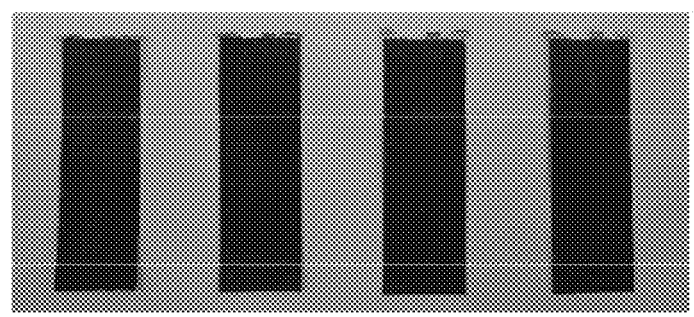
FIG. 10 is an image showing the results of evaluating durability of a negative electrode of Example 2.
Figure 11:
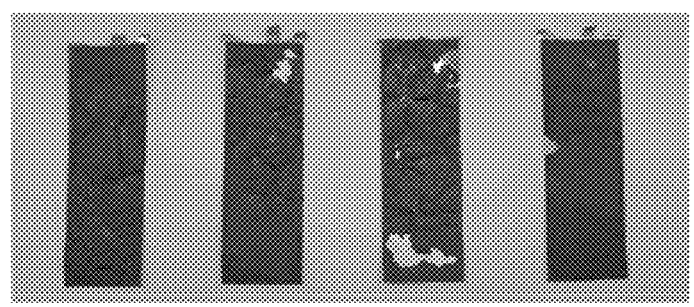
FIG. 11 is an image showing the results of evaluating durability of a negative electrode of Comparative Example 1.

As shown in FIGS. 10 and 11 and Table 1, the negative electrode of Example 2 is understood to have an enhanced binding force between the Si-nanoparticles and the negative electrode current collector with respect to the coating of the gel PAN.

As described above, according to the one or more of the above embodiments, use of the disclosed negative active material provides improved durability of an electrode of a lithium battery and improved charge/discharge performance.

It should be understood that the embodiments described herein should be considered in a descriptive sense only and not for purposes of limitation. Descriptions of features, advantages or aspects within each embodiment should be considered as available for other similar features, advantages, or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A negative active material comprising:
   a composite particle comprising
      a non-carbonaceous nanoparticle that allows lithiation and delithiation of lithium ions, and
      a (meth)acryl polymer disposed on a surface of the non-carbonaceous nanoparticle; and
   a crystalline carbonaceous nanosheet,
   wherein an average particle diameter of the non-carbonaceous nanoparticle is less than or equal to about 500 nanometers.

2. The negative active material of claim 1, wherein the (meth)acryl polymer comprises at least one monomer repeat unit selected from —($C_3H_3N$)—, —($C_3H_5NO$)—, —($C_3H_4O_2$)—, and —($C_3H_3O_2R$)— wherein R is selected from a $C_1$-$C_{10}$ alkyl group, a $C_6$-$C_{20}$ aryl group, and a $C_3$-$C_{20}$ heteroaryl group, and wherein a weight-average molecular weight of the (meth)acryl polymer is from about 100,000 Daltons to about 1,000,000 Daltons.

3. The negative active material of claim 1, wherein the (meth)acryl polymer comprises at least one selected from polyacrylonitrile, polyacrylamide, polyacrylic acid, and a poly(meth)acrylate.

4. The negative active material of claim 1, wherein an amount of the (meth)acryl polymer is from about 1 to about 40 parts by weight, based on 100 parts by weight of a total weight of the non-carbonaceous nanoparticle and the (meth)acryl polymer.

5. The negative active material of claim 1, wherein the (meth)acryl polymer is in a form of a layer on the surface of the non-carbonaceous nanoparticle, and wherein a thickness of the layer of the (meth)acryl polymer is from about 0.1 nanometer to about 50 nanometers.

6. The negative active material of claim 1, wherein the non-carbonaceous nanoparticle comprises at least one element selected from silicon (Si), germanium (Ge), tin (Sn), lead (Pb), aluminum (Al), gallium (Ga), indium (In), zinc (Zn), cadmium (Cd), magnesium (Mg), calcium (Ca), titanium (Ti), vanadium (V), and bismuth (Bi).

7. The negative active material of claim 1, wherein the non-carbonaceous nanoparticle comprises a material selected from Si, $SiO_x$ wherein 0<x<2, an alloy of the formula Si—Z wherein Z is an alkali metal, an alkaline earth metal, a Group 13 element, a Group 14 element, a Group 15 element, a Group 16 element, a transition metal, a rare earth element, or a combination thereof and is not Si; Sn, $SnO_2$, an alloy of the formula Sn—Z' wherein Z' is at least one selected from an alkali metal, an alkaline earth metal, a Group 13 element, a Group 14 element, a Group 15 element, a Group 16 element, a transition metal, and a rare earth element and is not Sn.

8. The negative active material of claim 1, wherein an average particle diameter of the non-carbonaceous nanoparticle is from about 1 nanometer to about 500 nanometers.

9. The negative active material of claim 1, wherein the non-carbonaceous nanoparticle comprises a first non-carbonaceous nanoparticle and a second non-carbonaceous nanoparticle, wherein the first and second non-carbonaceous nanoparticles are connected to each other in a linear form to form a secondary particle.

10. The negative active material of claim 1, wherein the crystalline carbonaceous nanosheet comprises a polycyclic nanosheet comprising planar rings of carbon atoms, a laminate of the polycyclic nanosheet, an oxide of the polycyclic nanosheet, or a combination thereof.

11. The negative active material of claim 1, wherein a thickness of the crystalline carbonaceous nanosheet is from about 0.1 nanometer to about 50 nanometers.

12. The negative active material of claim 1, wherein an average area of the crystalline carbonaceous nanosheet is from about 1 square micrometer to about 100 square micrometers.

13. The negative active material of claim 1, wherein the composite particle and the crystalline carbonaceous nanosheet are mixed together.

14. The negative active material of claim 1, wherein the composite particle and the crystalline carbonaceous nanosheet are combined in a weight ratio of about 70:30 to about 95:5.

15. A lithium battery comprising:
a negative electrode comprising the negative active material of claim 1;
a positive electrode disposed facing the negative electrode; and
an electrolyte disposed between the negative electrode and the positive electrode.

16. The lithium battery of claim 15, wherein the lithium battery is a flexible lithium battery.

17. A method of preparing a negative active material, the method comprising:
combining a (meth)acryl polymer, a non-carbonaceous nanoparticle that allows lithiation and delithiation of lithium ions, and a solvent to form a mixture;
combining the mixture and a surfactant to form an emulsion;
heat-treating the emulsion;
washing the heat-treated emulsion to form a composite particle comprising the (meth)acryl polymer on a surface of the non-carbonaceous nanoparticle; and
mixing the composite particle with a crystalline carbonaceous nanosheet to form the negative active material.

18. The method of claim 17, wherein the surfactant comprises a non-ionizing polyether surfactant.

19. The method of claim 17, wherein the non-ionizing polyether surfactant comprises a polyoxyethylene-polyoxypropylene block copolymer or a derivate thereof.

20. The method of claim 17, wherein the solvent is a polar organic solvent.

* * * * *